US 7,749,080 B2

(12) United States Patent
Szrek et al.

(10) Patent No.: US 7,749,080 B2
(45) Date of Patent: Jul. 6, 2010

(54) METHOD AND SYSTEM FOR AUTHENTICATION

(75) Inventors: Walter Szrek, East Greenwich, RI (US); Thomas K. Oram, Hudson, MA (US)

(73) Assignee: GTECH Rhode Island Corporation, Providence, RI (US)

( * ) Notice: Subject to any disclaimer, the term of this patent is extended or adjusted under 35 U.S.C. 154(b) by 185 days.

(21) Appl. No.: 11/056,857

(22) Filed: Feb. 11, 2005
(Under 37 CFR 1.47)

(65) Prior Publication Data

US 2006/0040726 A1    Feb. 23, 2006

(51) Int. Cl.
*A63F 13/12* (2006.01)
*G06F 17/00* (2006.01)

(52) U.S. Cl. .................. 463/29; 463/17; 463/18; 463/42; 463/43; 273/138.1; 273/139; 705/67; 713/155; 713/170; 713/186; 902/2; 902/3; 902/23

(58) Field of Classification Search ............. 463/17–19, 463/21–22, 33, 49, 16, 20, 23, 25–32, 39–43; 273/138.1, 139, 138.2, 317.1, 460, 461, 141 A, 273/454–456; 713/1, 100, 150, 182, 187, 713/188, 189, 300, 375, 400, 500, 600, 155, 713/170, 176, 183–184, 186; 709/203–207, 709/FOR. 113; 902/2–3, 23, 38, 40; 705/56–57, 705/64, 67, 72, 74–75, 78–79
See application file for complete search history.

(56) References Cited

U.S. PATENT DOCUMENTS 4,757,534 A * 7/1988 Matyas et al. ................ 705/56
5,280,527 A * 1/1994 Gullman et al. ............. 713/184
5,790,677 A * 8/1998 Fox et al. ...................... 705/78

(Continued)

FOREIGN PATENT DOCUMENTS

EP    0 855 685    7/1998

(Continued)

OTHER PUBLICATIONS

Menezes, Alfred J. et al., Handbook of Applied Cryptography, 1997, CRC Press LLC, Revised Reprint with Updates, pp. 385-405.*

(Continued)

*Primary Examiner*—Peter DungBa Vo
*Assistant Examiner*—Arthur O. Hall
(74) *Attorney, Agent, or Firm*—Sullivan & Worcester LLP; Christopher T. McWhinney (57) ABSTRACT

Embodiments of the present invention provide a method and system for authentication. In one embodiment, a first identifier associated with an item to be authenticated may be received. A first decryption key associated with the item may also be received. The first identifier may be decrypted using the first decryption key to generate a second identifier. The contents of an authentication database may be searched to find a match for the second identifier. If a match for the second identifier is found in the authentication database, the item may be confirmed as authentic. In embodiments of the present invention, the item may be a lottery ticket, a document, a receipt, a ticket, a credit card, etc.

74 Claims, 7 Drawing Sheets

U.S. PATENT DOCUMENTS

| | | | |
|---|---|---|---|
| 5,883,810 A * | 3/1999 | Franklin et al. | 700/232 |
| 5,915,588 A | 6/1999 | Stoken et al. | |
| 5,970,143 A * | 10/1999 | Schneier et al. | 713/181 |
| 6,149,522 A * | 11/2000 | Alcorn et al. | 463/29 |
| 6,154,879 A * | 11/2000 | Pare et al. | 705/35 |
| 6,226,744 B1 * | 5/2001 | Murphy et al. | 726/5 |
| 6,246,771 B1 * | 6/2001 | Stanton et al. | 380/286 |
| 6,370,250 B1 * | 4/2002 | Stein | 380/281 |
| 6,453,416 B1 * | 9/2002 | Epstein | 713/170 |
| 6,557,759 B1 * | 5/2003 | Zolotarev et al. | 235/380 |
| 6,577,759 B1 | 6/2003 | Zototarev et al. | |
| 6,611,812 B2 * | 8/2003 | Hurtado et al. | 705/26 |
| 6,612,928 B1 * | 9/2003 | Bradford et al. | 463/29 |
| 6,820,201 B1 * | 11/2004 | Lincoln et al. | 713/179 |
| 6,915,279 B2 * | 7/2005 | Hogan et al. | 705/64 |
| 6,938,019 B1 * | 8/2005 | Uzo | 705/65 |
| 6,941,285 B2 * | 9/2005 | Sarcanin | 705/67 |
| 6,963,971 B1 * | 11/2005 | Bush et al. | 713/153 |
| 6,990,470 B2 * | 1/2006 | Hogan et al. | 705/64 |
| 7,069,439 B1 * | 6/2006 | Chen et al. | 713/172 |
| 7,080,037 B2 * | 7/2006 | Burger et al. | 705/50 |
| 7,099,478 B2 * | 8/2006 | Tomlinson | 380/280 |
| 7,155,745 B1 * | 12/2006 | Shin et al. | 726/27 |
| 7,168,089 B2 * | 1/2007 | Nguyen et al. | 726/4 |
| 7,181,017 B1 * | 2/2007 | Nagel et al. | 380/282 |
| 7,188,362 B2 * | 3/2007 | Brandys | 726/9 |
| 7,195,154 B2 * | 3/2007 | Routhenstein | 235/380 |
| 7,454,363 B1 * | 11/2008 | Rowe | 705/14 |
| 7,523,490 B2 * | 4/2009 | Guo et al. | 726/10 |
| 7,624,280 B2 * | 11/2009 | Oskari | 713/185 |
| 2001/0020228 A1 * | 9/2001 | Cantu et al. | 705/1 |
| 2002/0034305 A1 * | 3/2002 | Noyama et al. | 380/282 |
| 2002/0124176 A1 * | 9/2002 | Epstein | 713/186 |
| 2002/0172367 A1 * | 11/2002 | Mulder et al. | 380/277 |
| 2003/0039360 A1 * | 2/2003 | Younis | 380/270 |
| 2004/0023711 A1 * | 2/2004 | Knapp | 463/17 |
| 2006/0072755 A1 * | 4/2006 | Oskari | 380/270 |
| 2007/0067836 A1 * | 3/2007 | Busboom et al. | 726/10 |
| 2009/0307497 A1 * | 12/2009 | Appenzeller et al. | 713/171 |

FOREIGN PATENT DOCUMENTS

| | | |
|---|---|---|
| WO | WO 01/65397 | 9/2001 |

OTHER PUBLICATIONS

Mitchell, C., "Authentication using cryptography", Computers & Security, 1997, p. 25-32, vol. 2, No. 2, Elsevier Science Publishers, Amsterdam, NL.

International Search Report dated Dec. 17, 2004, Application No. PCT/US2004/14916, filed May 11, 2004.

Schneier, Bruce, "Applied cryptography" John Wiley & Sons, New York, pp. 34-41, 1996.

Supplementary European Search Report dated May 31, 2006, EP Application No. 04 75 2046.

* cited by examiner

METHOD AND SYSTEM FOR AUTHENTICATION

TECHNICAL FIELD

The present invention relates to authentication and/or privacy of documents or other items. In particular, embodiments of the present invention provide a method and system for verifying the integrity of such items, while maintaining privacy with respect to these items.

BACKGROUND OF THE INVENTION

Many transactions involve the use documents and/or other items such as lottery tickets, receipts, tickets, checks, coupons, cards, or the like that can later be used, or redeemed for a service or item of value such as cash at a later time, or to identify a person who wants to perform a transaction. There are a number of companies that may be involved in generating and/or printing such items.

Many techniques may be available to maintain the privacy, integrity and/or authenticity of such items. For example, documents or other items may be printed with some form of identification number or the like that can be validated at the time of use or redemption. In some cases, especially where the value of the document or item such as the redemption value of a lottery ticket is high, the identification number printed on the item may also be used to verify, for example, that the redemption for that item such as a lottery ticket or coupon occurs only once. In this case, the identification number can be unique within the context or domain in which the document or item is used.

In come cases, a time limit may be established during which time the item is considered valid. For example, certain items such as lottery tickets may have a time limit for redemption after which the item may be invalid and may not be redeemable. In some cases, items such as lottery tickets may never be claimed during that time limit because they may be lost or destroyed. Such items could be maliciously recreated so that these items may be used or redeemed prior to expiration. For example, an insider or individual involved with generating or creating such documents, who has access to a database of redeemed and unredeemed tickets may recreate the lottery tickets that are about to expire and/or have not been redeemed.

In the case of a lottery ticket, where a winning ticket must be claimed within, for example, 1 year after the draw, an insider who has access to the unclaimed ticket file could be reasonably assured that if a winning ticket had not been cashed, and is about to expire in a week or so, then the ticket will probably not be cashed at all. The insider could recreate the ticket and cash it.

In another example, in a sporting event or a concert, it can be reasonably assumed that a ticket not presented sometime after the event began would probably never be presented. An insider with access to a database of tickets might create a false, duplicate ticket containing the original identification number. That ticket could be used to gain entry or could be sold to someone else who could gain entry.

In some cases, there may be no particular time limit, however the documents such as tickets may have different values, but the value is not known at the time of purchase. In this case, if an insider has access to a database of tickets and their values, the insider could, perhaps, print out the identification numbers for all high-value tickets. With that information, the insider might be able to peruse an inventory of tickets and extract only those of high value.

For example, in a 'scratch-off' or 'instant' ticket game, tickets may be printed with identification numbers and delivered to retailers where they are sold. The value of the ticket may be hidden under latex, for example. After purchasing the ticket, the player scratches the latex and, if the ticket is a winner, presents it for redemption to a retailer. The retailer may validate the ticket against a centralized database. If the ticket is validated, the player may redeem the value of the ticket. In this example, if an insider had access to the database that identifies the tickets and corresponding values, the insider may go to a retail establishment and scan through the available tickets, selecting and purchasing only those that have high value. The individual may then proceed to fraudulently redeem those tickets.

In another example, such as a coupon promotion for a store where the purchaser scratches off an area of the coupon to determine a discount amount, an insider may be able to scan the inventory of coupons and extract and use only those coupons with high value. In another example, a card such as a credit card or social security card could be used to identify a person who is performing a transaction. In these cases it is important to authenticate the card, while protecting the privacy of the item in a database so that others cannot impersonate the cardholder.

Accordingly there is a need in the art to maintain the privacy, integrity and or authenticity of documents and/or other items. For example, there is a need in the art to prevent the use of forged tickets, receipts, checks, cards, coupons, etc. There is a need to ensure, for example, that a holder of a document or a card such as a credit card is bonafide and is entitled to the value and/or services provided by the document or other item. For example, there is a need to prevent an insider from knowing the identification number of a ticket, even though the insider has access to the database that will be used for ticket redemption.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Embodiments of the present invention provide a method and apparatus for protecting the privacy, integrity and/or authenticity of items such as lottery tickets, game tickets, documents, cards, and/or other items. Embodiments of the present invention may use encryption techniques to mark or identify items and to prevent illegitimate or unauthorized use and/or creation of these items. In one embodiment of the invention, the item may include an identification number and a decryption key. The decryption key may be used to decrypt the identification number. The decrypted identification number may be compared with the contents of an authentication database that may contain a list of authentic lottery tickets, documents or other items. If a match for the decrypted identification number is found in the authentication database, the item may be confirmed as authentic.

In embodiments of the invention, the keys used to encrypt and/or decrypt an identifier may be random and/or may be independent of the contents of the authentication database, for example.

Figure 1:
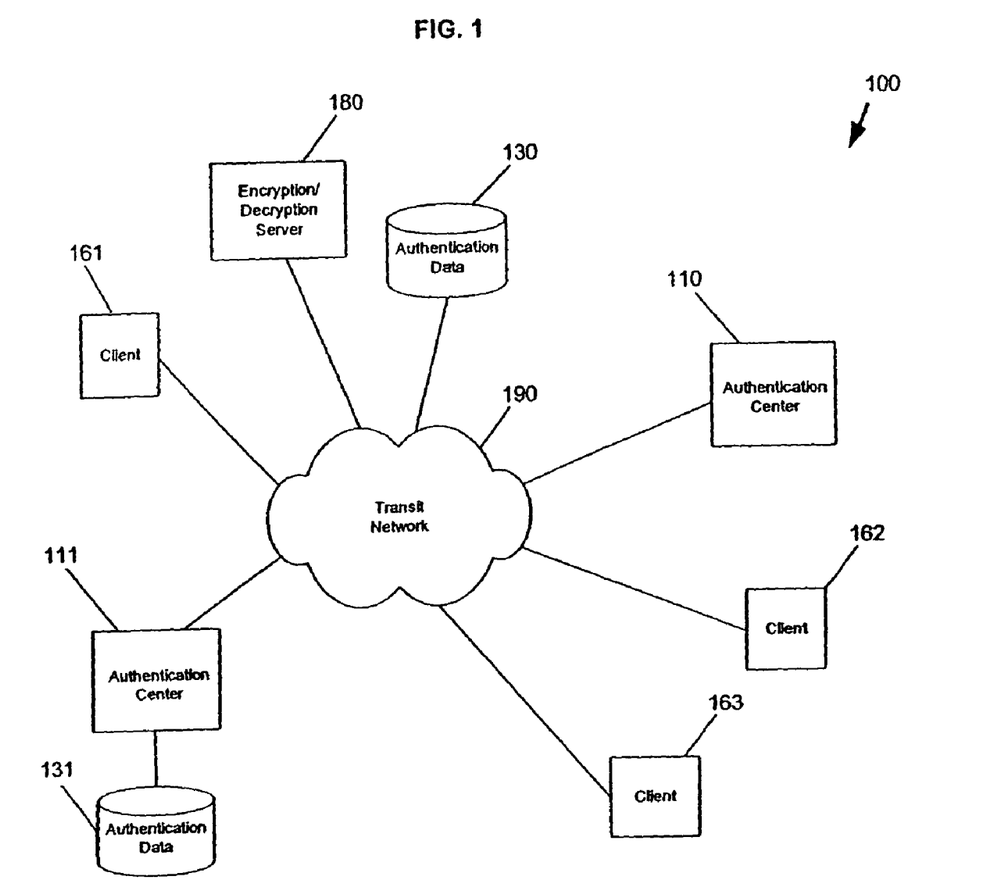
FIG. 1 is a block diagram of a authentication system in accordance with an embodiment of the present invention.

FIG. 1 is an exemplary block diagram of an authentication system 100 in which embodiments of the present invention may find application. As shown in FIG. 1, a plurality of clients, for example, clients 161-163 may be coupled to a transit network 190. The system may further include authentication centers 110-111, databases 130-131 containing authentication data, and/or encryption/decryption server 180, for example. It is recognized that additional clients, databases, authentication centers, servers and/or other components or devices may be included in embodiments of the present invention.

In embodiments of the present invention, clients 161-163 may be any type of public or private entities. For example, clients 161-163 may be retailers, vendors, banks, government agencies or any other entity. In one example, the client may be a vendor of lottery tickets or may be a retailer who accepts coupons such as promotional coupons. In another example, the client may be a facility where tickets or an ID may be needed for entry. For example, the facility may be a sports facility, a concert hall, airport or the like.

Embodiments of the present invention provide an apparatus, system and/or method for authenticating an item and/or for verifying that a person in possession of such item is bonafide. In embodiments of the present invention, an item as used herein may be a document, lottery ticket, game ticket, receipt, ticket such as an entry ticket to a facility, check, coupon, a card such as a credit card or debit card, an identification (ID) card, social security card, smart card, or the like that can later be used, or redeemed for a service or item of value such as cash at a later time, or to identify a person who wants to perform a transaction. The item as used herein may be embodied in any type of physical and/or electronic media such as a chip, smart card, memory card such as a flash card or memory stick, a disc such as a floppy disc or compact disc, or any other type of electronically media. The item to be authenticated may be transmitted over any type of data and/or communications network.

Clients 161-163 may include for example scanners such as barcode scanners or other types of input devices such as keyboards that may be used to enter and/or read data from the items. It is recognized that clients may have other equipment or components to facilitate communications with, for example, the authentication centers 110-111, encryption/decryption server 180 and/or other clients 161-163 over the transit network. It is recognized that if a client 162, for example, is a lottery ticket vendor, the client 162 may have a lottery ticket machine that may be used to vend tickets, read information from the lottery tickets and/or may communicate over the network 190. It is recognized that embodiments of the invention may be incorporated within such lottery ticket machine or other client device.

In embodiments of the present invention, authentication centers 110-111 may include encryption and/or decryption devices (to be described below in detail) or the like that may be used to create authentication information for an item and/or may also verify whether a particular item is valid or authentic. As part of the authentication process, in embodiments of the present invention, the system may determine whether the presenter or holder of the item is legitimate and/or has valid possession of the item and thus, is entitled to the value and/or services accorded to her on the basis of being in possession of such item. For example, if the item is a lottery ticket, embodiments of the present invention may verify that the item is authentic and thus, presumably the individual presenting the ticket legitimately purchased the lottery ticket before the drawing and is entitled cash out a winning ticket. It is recognized that such authentication centers 110-111 and/or authentication devices may be located remotely from the client's location or may be located in proximity to or internal to the client's location. As shown in FIG. 1, authentication database 131 may be coupled to, for example, authentication center 111.

In embodiments of the present invention, authentication databases 130-131 may include a list of items that are authentic or valid. The databases 130-131 may include one or more identifiers such as characters, numbers and/or and or any combination thereof that may identify the item and may be used to authenticate or validate the item. It is recognized that the databases 130-131 may be located remotely from the authentication centers 110-111 or may be located in proximity to or internal to the authentication centers 110-111 and/or clients 161-163, for example. It is recognized authentication databases 130-131 may be a single centralized database and/or may be a plurality of databases that may be located in a variety of places in system 100, for example.

It is recognized that the various databases as described herein such as the authentication databases or any other databases may be configured as relational databases, flat files, hierarchical databases, transactional systems, object oriented databases and/or an other type of configuration.

Transit network 190 may be a communications network that may include, for example, a public switched telephone network (PSTN), an Integrated Services Digital Network (ISDN), a cellular network, a digital mobile network, a Personal Communication Systems (PCS) network, an Internet, an intranet, a signaling system 7 (SS7) network, a local area network (LAN), a satellite network, an advance intelligent network (AIN), any suitable digital or analog network, a broadband network such as a cable network, any other suitable national and/or international communications network or any suitable combination thereof. It is recognized that embodiments of the present invention may utilize magnetic or optical media (e.g., hard drives, tapes, disks, etc.) to store and/or transmit data. A retailer or client may process a transaction offline and may later send the information via a disk, tape, or other transmission media to an authentication center for authentication.

In embodiments of the present invention, a private item identification number (herein a private ID) may be established for each item. The private ID may identify the item and/or may be unique within the domain or context of the item to which it relates or identifies. The private ID may be stored, in any form, in a centralized database such as the authentication databases 130-131, for example, along with other information. In one example, the private ID may be an internal number that may not be included in the item itself but maintained separately and/or independently in the database. This private ID may relate to the item and may be used to authenticate the item.

In embodiments of the present invention, an encryption key may be used to generate a public item identification number (herein a public ID) that may be associated with the item. The encryption key may be generated randomly when, for example, the public ID is created. To maintain security and/or privacy, the encryption key may be generated independent of any other database and/or device. The public ID may be printed on the item and/or may be associated with another identifier that may be printed on the item in any format such as numbers and/or characters, barcode, and/or any combination thereof. If the identifier printed on the item is not the public ID number, for example, then a separate database may be maintained that correlates the identifier printed on the item and the generated public ID number.

In embodiments of the present invention, the encryption key may be used to encrypt the private ID to produce the public ID or an encrypted private ID. In embodiments of the present invention, the encryption key may be associated with a decryption key that may be used to decrypt the public ID to obtain the private ID. It is recognized that the encryption key and the decryption key could be the same or could be different. In one embodiment, the decryption key may be printed on or included with the item in any form.

In another embodiment of the invention, the decryption key may be omitted from the item itself but an association between the decryption key and an identifier, such as the public ID printed on the item, may be maintained in a separate database. Such a database may be stored in, for example, secured server 180 and may be accessed to retrieve a decryption key to decrypt the public ID and generate a private ID to authenticate the item.

In an embodiment of the present invention, the various identifiers such as the public IDs and/or decryption or encryption keys may be printed on or included with the item in any form. For example, such information may be presented in a barcode format or as alpha, numeric and/or alphanumeric characters, or other format and/or any combination thereof. Such information may be read by a scanner or may be entered manually via a keyboard or other input device. The information included on the item may be visible or may be hidden. For example, the public ID and/or decryption key may be under latex or similar covering which may need to be removed or scratched to reveal this information on the item.

In embodiments of the invention, by encrypting the internal number such as the private ID using a randomly generated encryption key, the public ID may no longer be unique. When the item is presented, an authentication process, in accordance with embodiments of the present invention, may be employed to verify that the item is authentic and/or that the presenter or holder of the item is bonafide. For example, the key included with the item or another key may be used to decrypt the public ID. The result of the decryption process such as the decrypted public ID may be compared with contents of, for example, the authentication database 130 or 131. If a match in the database is found, the item may be authenticated and the client who made the authentication request may be notified. If a match in the database is not found, the item may not be authenticated and the client may be so alerted.

Figure 1A:
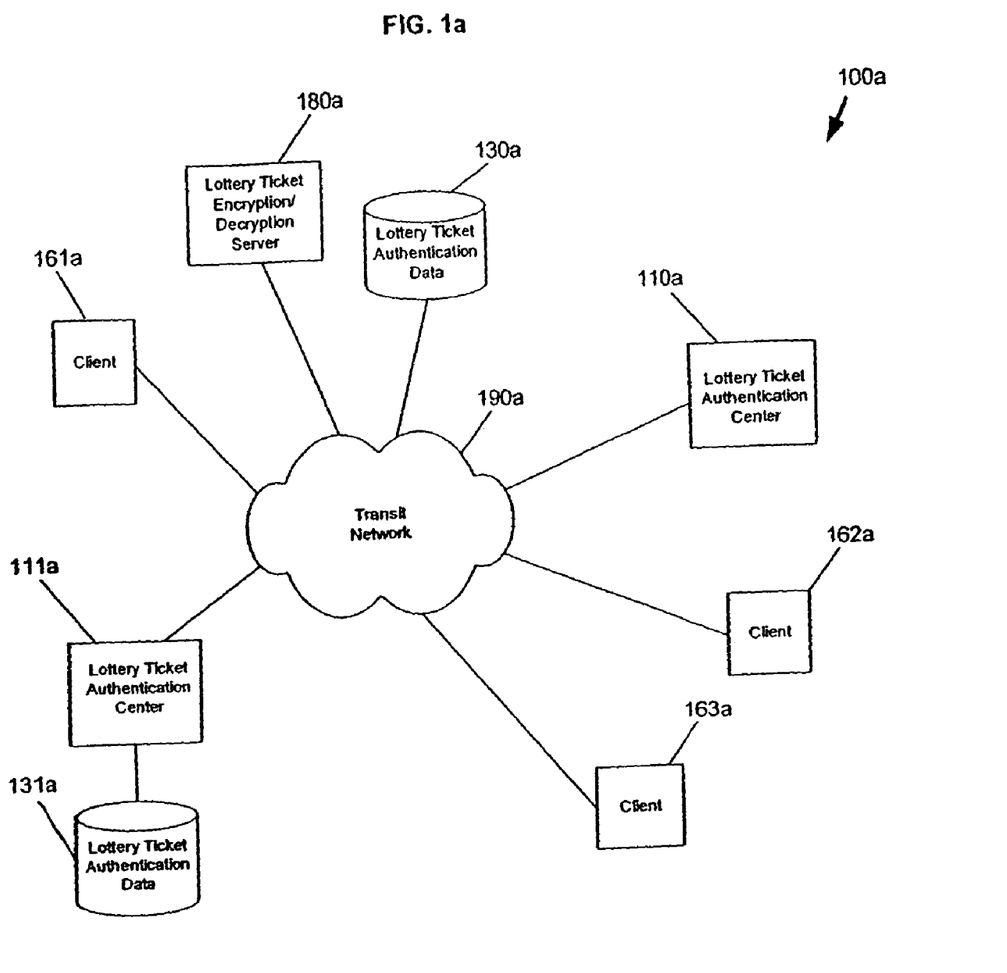
FIG. 1a is a block diagram of a lottery ticket authentication system in accordance with an embodiment of the present invention.

FIG. 1*a* is an exemplary block diagram of a lottery ticket authentication system 100*a* in which embodiments of the present invention may find application. As shown in FIG. 1*a*, a plurality of clients, for example, clients 161*a*-163*a* may be coupled to a transit network 190*a*. In this embodiment, clients 161*a*-163*a* may be lottery ticket vendors, entities who may payout or payoff on winning lottery tickets, or other individual or entities involved in dealing with lottery tickets. The transit network 190*a* may be similar to network 190 described above or may be another proprietary network. The system may further include lottery ticket authentication centers 110*a*-111*a*, lottery ticket authentication databases 130*a*-131*a* containing authentication data related to lottery tickets, and/or lottery ticket encryption/decryption server 180*a*, for example. It is recognized that additional clients, databases, authentication centers, servers and/or other components or devices may be included in the lottery ticket authentication system shown.

Embodiments of the present invention provide an apparatus, system and/or method for authenticating a lottery ticket and/or for verifying that a person in possession of such a ticket is bonafide and is entitled to a pay-out for a winning ticket. It is recognized that a lottery ticket may be embodied in a paper document, a smart card, or any other physical and/or electronic embodiment. In embodiments of the present invention, an individual may be able to redeem a winning lottery ticket over a network such as the Internet. The individual may transmit ticket information over the Internet. An authentication process may be performed using the ticket information, in accordance with embodiments of the present invention. If the ticket information is authenticated, the winnings may be, for example, direct deposited to a bank account, sent in the form of a bank check or in any other format As indicated above, the clients 161*a*-163*a* may include for example scanners such as barcode scanners or other types of input devices such as keyboards that may be used to enter and/or read data from the items that may be used to input information from the lottery ticket.

In embodiments of the present invention, lottery ticket authentication centers 110*a*-111*a* may include an authentication device (to be described in more detail below) or the like that may be used to verify whether a particular item is valid or authentic. As shown in FIG. 1*a*, lottery ticket authentication database 131*a* may be coupled to, for example, lottery ticket authentication center 111*a*.

In embodiments of the present invention, the lottery ticket authentication databases 130*a*-131*a* may contain a list of lottery tickets that are authentic or valid. The databases 130*a*-131*a* may include one or more lottery ticket identifiers such as a private ID or the like that may identify the lottery ticket and may be used to authenticate or validate the lottery ticket. It is recognized that the encryption key or keys and/or decryption key or keys, and/or other data associated with the lottery ticket authentication may be generated and/or processed in accordance with embodiments of the present invention as described herein to verify that the lottery ticket is authentic.

Figure 2:
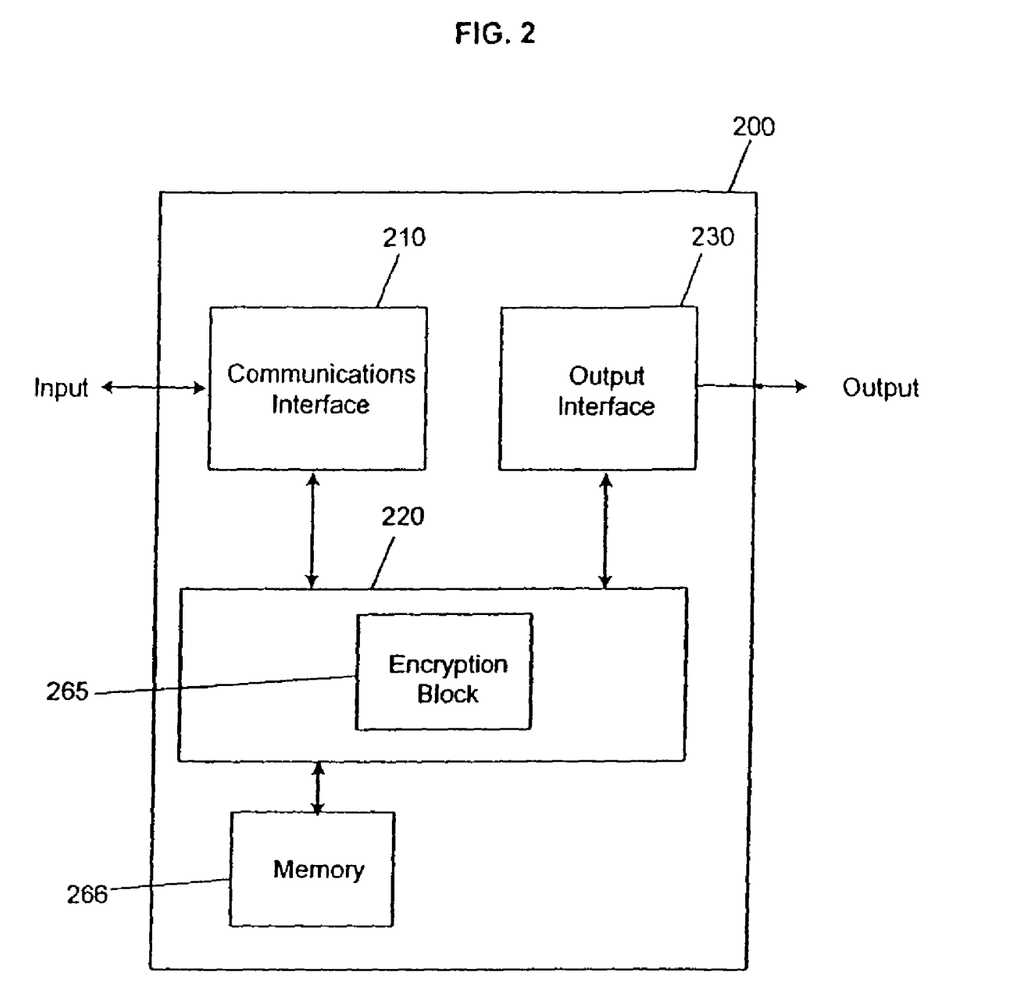
FIG. 2 illustrates a block diagram of an encryption device in accordance with an embodiment of the present invention.
Figure 2A:
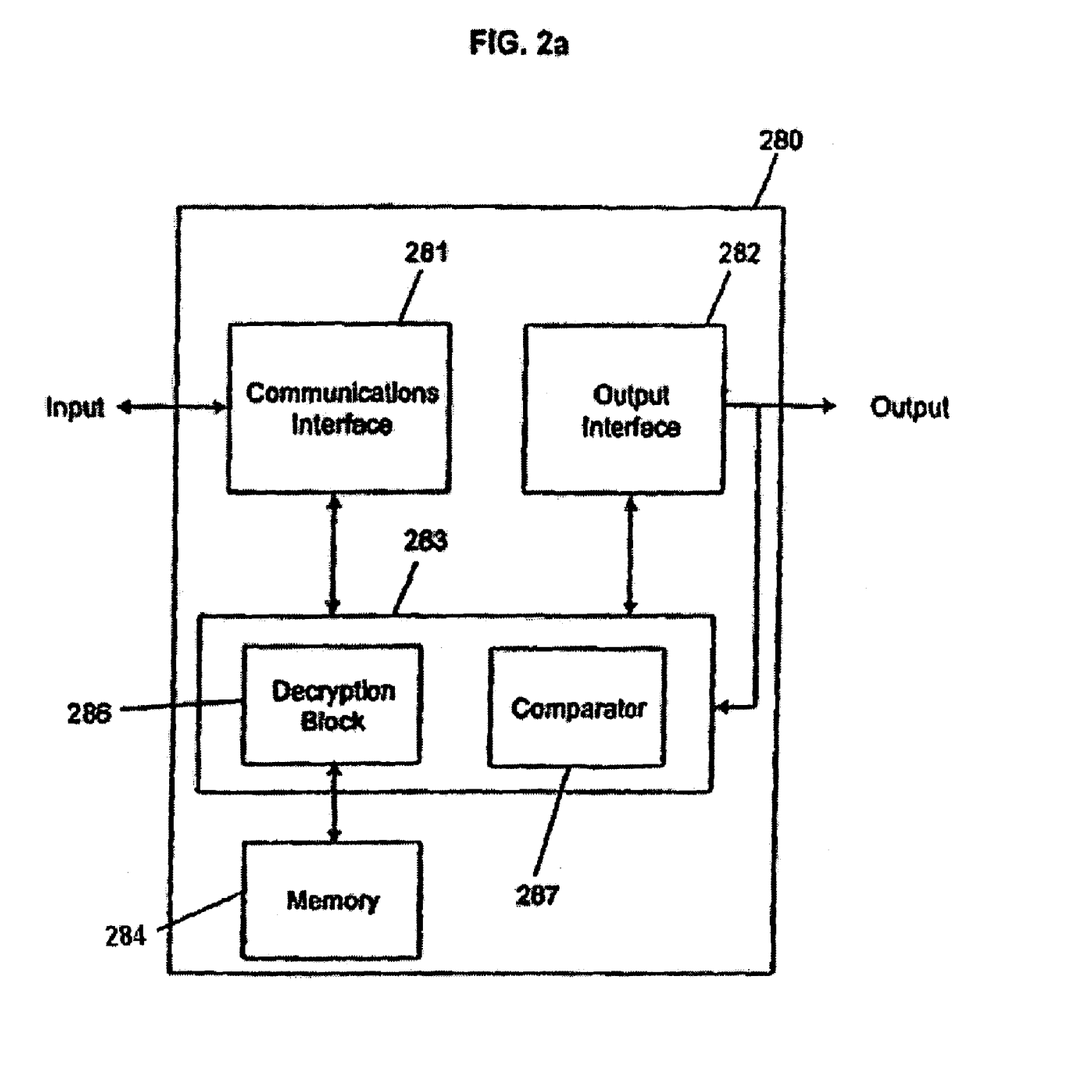
FIG. 2a illustrates a block diagram of a decryption device in accordance with an embodiment of the present invention.

FIG. 2 shows a block diagram of an encryption device 200 in accordance with embodiments of the present invention. In embodiments of the present invention, the encryption device 200 may generate encrypted data that may be used to determine whether the item such as the lottery ticket is authentic. FIG. 2*a* shows a block diagram of a decryption device 280 that may be used to decrypt data and/or to determine whether the item being authenticated such as a lottery ticket is authentic or valid.

In an embodiment of the present invention, the encryption device 200 may encrypt a private ID to generate an encrypted private ID or a public ID for the item such as a lottery ticket. The item encryption device 200 may include, for example, a communication interface 210, processing unit 220, a memory 266 and output interface 230. These components may be of any type as is well known in the art. It is recognized that the encryption device 200 may include additional components that are omitted for convenience. The encryption device 200 and/or its functionality may be located at the authentication centers 110-111 or 110a-111a, the encryption/decryption server 180 or 180a, another component or device, and/or any combination thereof.

In an embodiment of the present invention, in operation, during an encryption process where a private ID may be encrypted, the communications interface 210 may receive, for example, a private ID related to a particular item. For example, the private ID may be a unique number related to the item such as a lottery ticket identifier. As indicated above, the private ID may be stored in, for example, the authentication database 130 or lottery ticket database 130a along with other private IDs, for example. In the encryption device 200, the received private ID may be sent to processing unit 220 for processing.

In embodiments of the present invention, the functionality described herein with respect to the encryption device 200 or any other device in the system 100 can be provided at another device such as the client 161-163 or 161, authentication centers 110-111, and/or encryption/decryption server 180, for example. It is also recognized that the functionality may be split among more than one device that may communicate over the transit network 190. For example, encryption and/or decryption, in accordance with embodiments of the present invention, may be performed at the encryption/decryption server 180, while the operation of searching the authentication database for a match may be performed by an authentication device that may be installed at the authentication centers 110-111 and/or at clients 161-163, for example.

In an embodiment of the present invention, the processing unit 220 may include an encryption block 265 that may use encryption keys to encrypt the private ID to generate an encrypted private ID or a public ID for the item such as a lottery ticket. The encryption block 265 may use an encryption key and/or known algorithms to encrypt the private ID. The keys and/or algorithms may be stored in memory 266, for example. The encryption techniques employed by the encryption block 265 may be for example, any symmetric methods, including trivial methods such as exclusive-or, modular addition, or may be cryptographically secure methods such as data encryption standard (DES) or advanced encryption standard (AES) and/or any other known encryption techniques. Additional encryption techniques may also include any asymmetric method, such as RSA, where the encryption key and decryption key are associated, but may be different.

In embodiments of the present invention, the encryption block 265 may employ one or more encryption algorithms and/or one or more encryption keys to generate an encrypted private ID (also referred to herein as the public ID) and one or more decryption keys. It is recognized that the encryption device 200 may use several encryption cycles to generate an encrypted private ID. For example, the private ID may be encrypted once and the encrypted result may be encrypted again using encryption keys to generate the final encrypted private ID or public ID. The decryption key or keys may be used to decrypt the encrypted private ID. The decryption key may also include an indicator such as a pointer to a memory location that identifies the algorithm that was used to encrypt the private ID. Thus, the same algorithm along with the decryption key may be used for decryption.

In embodiments of the present invention, the encrypted private ID or the public ID and the associated decryption key may be output via output interface 230. The output may be used to label the item and/or may be stored in a database. In one example, the public ID and the associated decryption key may be printed on the item such as the lottery ticket. The public ID may be used as the ticket number to identify the ticket. In another embodiment, as discussed above, the decryption key may be stored in a separate secured database and may be associated with the public ID printed on the item. If the public ID needs to be decrypted, the decryption key may be retrieved from the database for decryption purposes.

In an embodiment of the present invention, the encryption and/or decryption keys may be randomly generated based on some other aspect of the item such as a sequential item number or other information that may not available in the authentication database. The encryption key and/or decryption key may be unique to a single item or may be shared among a group of items. For example, each lottery ticket may have a separate public ID and associated encryption key and/or decryption key. In another example, a plurality of lottery tickets may share the same public ID and associated encryption and/or decryption key. In embodiments of the invention, the encryption key and the decryption key may be the same key or may be different keys. In embodiments of the present invention, the public ID may no longer be unique and many items may share the same public ID. This may occur, for example, because of the algorithm and/or key used for encryption.

As indicated above, FIG. 2a shows a block diagram of a decryption device 280 that may be used to decrypt data and/or to determine whether the item being authenticated such as a lottery ticket is authentic or valid. In an embodiment of the present invention, during an authentication process, the decryption device 280 may decrypt a public ID or the encrypted private ID to generate a decrypted ID or result for the item such as a lottery ticket. The result may be compared with the contents of an authentication database such as 130 or 130a. If a match is found, the corresponding item such as the lottery ticket being authenticated may be confirmed as authentic or valid.

In embodiments of the present invention, the decryption device 280 may include, for example, a communication interface 281, processing unit 283, a memory 284 and output interface 282. These components may be of any type as is well known in the art. These components may be the same as the ones used in the encryption device 200 and/or may be different. It is recognized that the decryption device 280 may include additional components that are omitted for convenience. The decryption device 280 and/or its functionality may be located at the authentication centers 110-111 or 110a-111a, the encryption/decryption server 180 or 180a, clients 161-163 or 161a-163a, another component or device, and/or any combination thereof. It is recognized that the decryption device 280 may be the same as the encryption device 200 or may be different.

In an embodiment of the present invention, in operation, during a decryption process or authentication process an authentication request to authenticate an item such as a lottery ticket may be received at the decryption device 280 from a client, for example. The authentication request may be received by the communications interface 281 from a client such as client 161 or another device. The authentication request may include, for example, a public ID or other identifier that may need to be decrypted and/or authenticated. The decryption device may also receive a decryption key that may be included in the authentication request or may be retrieved from another database based on the public ID or another identifier.

In an embodiment of the present invention, the authentication request to trigger an authentication process may be initiated by a vendor of lottery tickets or another entity that is being presented a lottery ticket for redemption. The entity may want to validate the ticket as authentic before making a payment on the ticket, for example. It is recognized, however, such authentication request may be made after a transaction is completed. The received public ID and/or decryption key may be may be read by a device such as a scanner or may be manually entered by the vendor on a keyboard or touch screen.

In embodiments of the present invention, the received information such as the public ID and/or one or more decryption keys may be forwarded to the processing unit 283 that may include a decryption block 286, comparator 287 or other components. The decryption block 286 may apply the one or more decryption keys to the public ID using known algorithms to generate a decrypted public ID or a resulting private ID, for example. It is recognized that the decryption block 286 may apply several decryption cycles to decrypt the received public ID. For example, if the private ID was encrypted twice, as described above, to decrypt the public ID, the public ID may need to be decrypted twice, in accordance with embodiments of the present invention. The algorithm used to encrypt the private ID may also be used to decrypt the public ID, for example. The received decryption key may include an indicator of the algorithm used for encryption so that it may also be used for decryption, for example. The memory 284 may store the plurality of algorithms and/or keys for use by the decryption device 280.

In embodiments of the present invention, the comparator 287 that may compare the decrypted public ID or a resulting private ID generated by the decryption block 286 with, for example, the private IDs stored in authentication database 130 or another database, for example. The comparator may search the contents of the authentication database for a match. If the decrypted public ID matches one of the stored private IDs in the authentication database 130, for example, the comparator may send a validation or authentication signal to the client who sent the authentication request, for example, client 161 via communications interface 281 or output interface 282. It is recognized that the decryption device 280 may be located in the authentication center 110-111 or 110a-111a, server 180 or 180a and/or a clients terminal at client 161-163 or 161a-163a.

In an alternative embodiment of the present invention, after the decryption device 280 has decrypted the public ID, the resulting decrypted public ID, the decryption device 280 may send the decrypted public ID to, for example, the authentication database 130, for example. The authentication database 130 may include a computer (omitted) that may search for the decrypted private ID in its memory. If a match in the authentication database 130 is found, a validation or authentication signal may be sent to the client directly or via the authentication device 200 or to the decryption device 280 that may forward it to the client.

In either case, upon receiving the validation signal or authentication signal from the decryption device 280, the client may complete the transaction such as cash a winning lottery ticket or provide other services.

It is recognized that the functionality described with respect to the authentication decryption 280 can be provided at authentication centers 110-111 or 110a-111a, server 180 or 180a and/or a clients terminal at client 161-163 or 161a-163a, databases 130-131 or 130a-131a and/or any other location on the system 100 or 100a. For example, the decryption device 280 may be incorporated, entirely or partially, in any of the foregoing locations or components.

In an embodiment of the present invention, the decryption key or a portion thereof, created by encrypting device 200, for example, may be transmitted to the authentication database such as database 130 in advance to verify that the decryption key, when eventually received by authenticator 280, is valid so that the decryption key can be used to decrypt the public ID. It is recognized that in some cases, the decryption key transmitted in advance may not be transmitted to the authentication database, but instead a 'hash' or 'signature' of the key may be sent that could be used to generate, retrieve and/or authenticate the decryption key.

In embodiments of the present invention, the decryption key may not be included or printed on the item, but may instead the decryption key may be stored in a secure repository or a separate encryption/decryption server 180, for example. The decryption device 280 may receive a request for authentication from a client or the like. The request for authentication may include a public ID and/or may include a decryption key identifier. The authentication device may send a request for a decryption key to the encryption decryption server 180. The request for the decryption key may include the public ID and/or another identifier or information such as a decryption key identifier. The public ID along with other information may identify the specific item or ticket being processed to the server 180. The server 180 may retrieve the requested decryption key from an internal memory and forward it to the decryption device 280 to generate the resulting decrypted public ID, as described above.

Alternatively, the encryption/decryption server 180 may be able decrypt the public ID using the stored decryption key using known algorithms, in accordance with embodiments of the present invention. In this case, the server 180 may forward the decrypted private ID to the decryption device 280 or the authentication database 130 for comparison and/or authentication.

In embodiments of the present invention, multiple encryption algorithms and/or encryption keys may be applied to the private ID number. For example, the private ID may be encrypted using one symmetric key or a set of asymmetric keys, for example, to derive an interim ID. The interim ID may again be encrypted using another symmetric key or asymmetric key to derive another interim ID or the public ID that may be included or linked with the item. In this case, the public ID may be decrypted using a first decryption key or set of keys to decrypt the public ID to generate the decrypted interim ID. Then the interim ID may be decrypted using the second decryption key or set of keys to derive the private ID.

In embodiments of the present invention, the authentication process, as described herein, may occur after the transaction is completed. For example, the transaction using a ticket or other item may be completed and the authentication process may not occur well after completed transaction. For example, this may occur in the normal course for certain transactions, or in the event the authentication device or service is unavailable for whatever reason.

In embodiments of the present invention, components included in system 100 and/or 100a such as the encryption device 200, decryption device 280, encryption/decryption server 180 or 180a, clients 161-163 or 161a-163a, databases 130-131 or 130a-131a and/or the authentication centers 110-111 or 110a-111a may include additional hardware and/or software components that are omitted for simplicity.

It is recognized that embodiments of the invention may include, for example, other components such as processors, computer readable memories, data ports or other interfaces, network ports or other interfaces, data buses and/or other hardware and/or software components (omitted). The data ports or other interfaces may permit the various devices to communicate with other devices and/or with the transit networks 190 and/or 190a. The data buses may connect the processor, the computer readable memory, the data port or other interface and/or the network port or other interface and may permit communications between the various components in embodiments of the invention.

It is recognized that appropriate data security measures may be employed to protect the integrity of the functionality provided by and/or the data contained in, for example, the encryption device 200, decryption device 280, encryption/decryption server 180 or 180*a*, clients 161-163 or 161*a*-163*a*, databases 130-131 or 130*a*-131*a* and/or the authentication centers 110-111 or 110*a*-111*a* and/or other components of the system 100. For example, appropriate firewalls and/or password protection maybe employed to secure the various devices and/or components of system 100.

In embodiments of the present invention, the transit networks 190 and/or 190*a* may include a plurality of switches, communication interfaces, and/or other components that are omitted for convenience. It is recognized that the communications that may be provided may include hard-line, wireless, RF, optical, or any other type of communications or any combination thereof. The various devices, systems, networks, etc. may be appropriately configured or equipped with hardware and/or software to operate in such environments.

Figure 3:
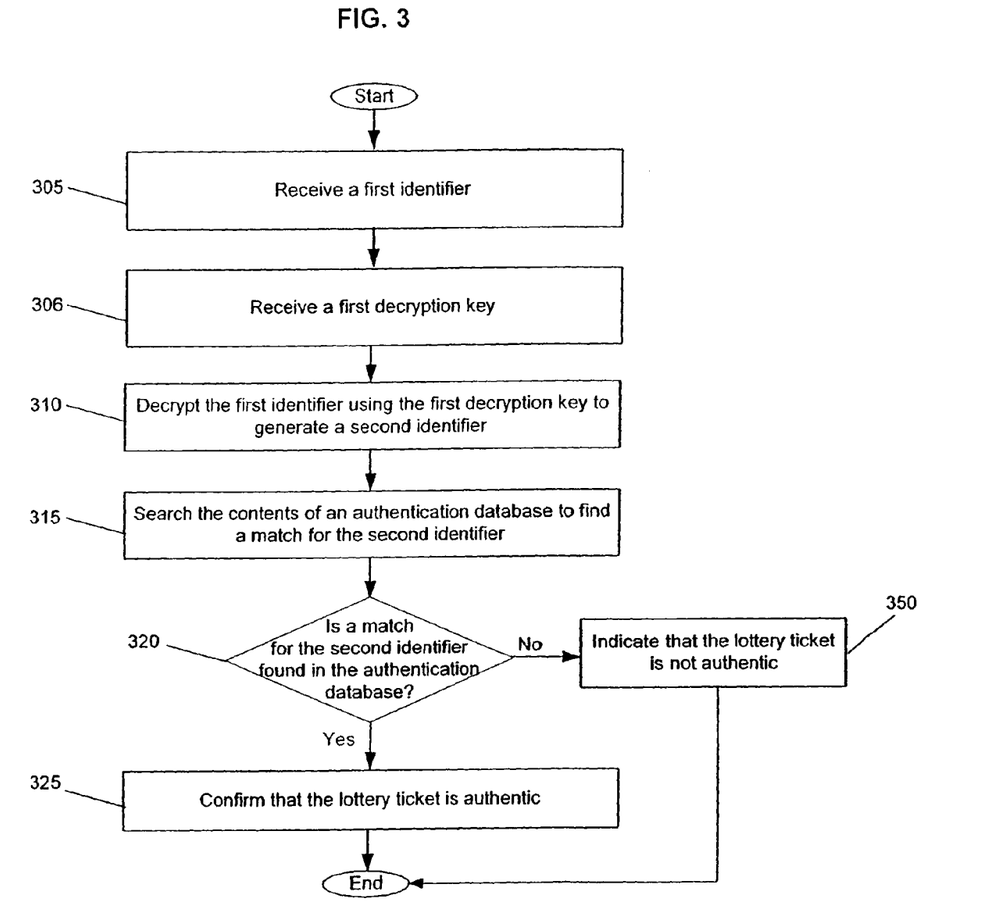
FIG. 3 is flowchart in accordance with an exemplary embodiment of the present invention.

FIG. 3 is a flowchart illustrating a method for authentication in accordance with embodiments of the present invention. This method may be applied in authenticating lottery tickets as well as other items such as documents, cards, etc. As shown in box 305, a first identifier may be received. In this example, the first identifier may be associated with a lottery ticket to be authenticated. A first decryption key may be received, as shown in box 306. The first identifier may be decrypted using the first decryption key to generate a second identifier, as shown in box 310. The contents of an authentication database may be searched to find a match for the second identifier, as shown in box 315. If a match for the second identifier is found in the authentication database, confirm that the item such as a lottery ticket is authentic, as shown in boxes 320-325. If a match for the second identifier is not found in the authentication database, an indication may be sent that the item such as a lottery ticket is not authentic, as shown in boxed 320 and 350.

Figure 4:
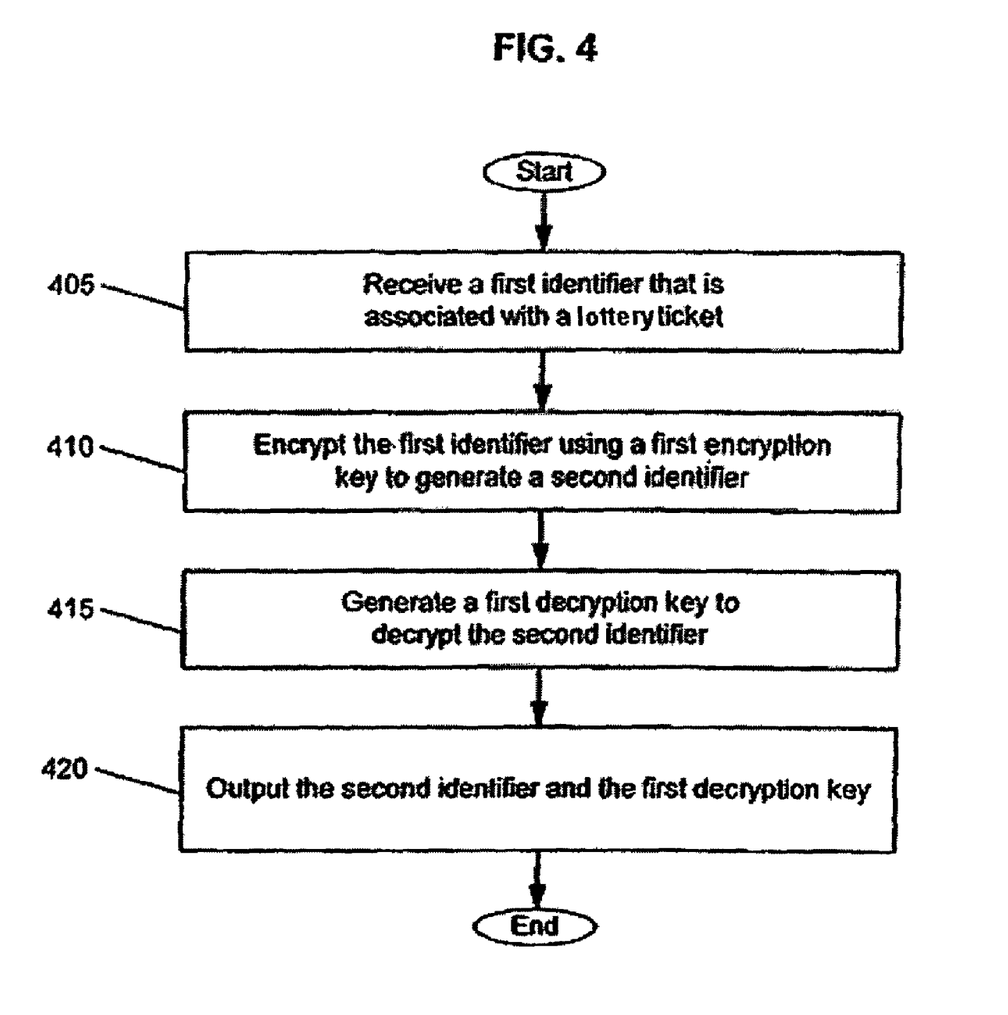
FIG. 4 is flowchart in accordance with an exemplary embodiment of the present invention.

FIG. 4 is a flowchart illustrating a method for generating authentication information in accordance with embodiments of the present invention. In this example, the authentication information may be generated for a lottery ticket or other items such as documents, cards, etc. As shown in box 405, a first identifier that is associated with a item such as a lottery ticket may be received. The first identifier may be encrypted using a first encryption key to generate a second identifier, as shown in box 410. A first decryption key may be generated to decrypt the second identifier, as shown in box 415. The second identifier and the first decryption key may be outputted, as shown in box 420. The second identifier and the first decryption key may be associated with the item. In embodiments of the present invention, the second identifier and the first decryption key may be printed on the lottery ticket.

Figure 5:
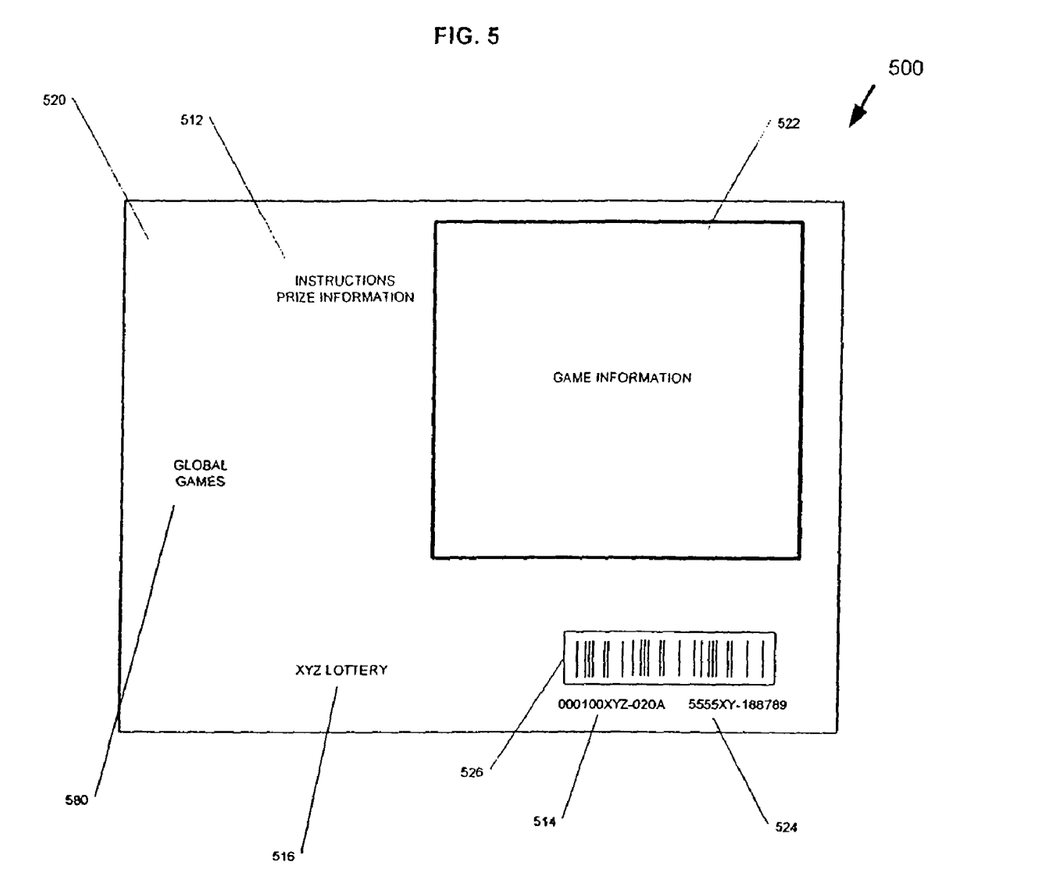
FIG. 5 is a diagrammatic representation of a lottery ticket in accordance with an exemplary embodiment of the preset invention.

FIG. 5 illustrates an example lottery ticket 500 in accordance with an embodiment of the present invention. It is recognized that lottery ticket 500 is given by way of example only and that a lottery ticket can be configured in any number of different ways. It is recognized that a lottery ticket may be embodied in a paper document, a smart card, or any other physical and/or electronic embodiment. The example lottery ticket 500 illustrated in FIG. 5 may be located on a substrate, e.g., a printable substrate such as paper, card stock, plastic, or various laminates. Information may be found on both sides of the example lottery ticket.

The example lottery ticket 500 may be for a pooled drawing game, an instant-win lottery game or any other type of game. As is known, in a pooled drawing game, a lottery ticket may represent a chance in a drawing to be held at some later time for a pooled prize or prizes. In an instant-win game, a winner may be determined at or before the time the ticket is purchased, although whether the ticket is actually a winner may be concealed from the buyer and seller. It is recognized that the example ticket may also be used for other forms of games, e.g., for promotional games such as those used in direct mail or at fast food restaurants.

In an embodiment of the present invention, the lottery ticket 500 may include a non-play area 520 and a play area 522. It is recognized that the non-play and play areas are used herein for description purposes only and are not limiting or exclusive. Information shown on the ticket and/or described herein may be located anywhere on the ticket and is not limited to be located in a play or non-play area.

In this example, the non-play area 520 may include, for example, information not directly involved in the play of the game provided on the ticket. Located on the non-play area may be instructions for playing the extended play game or for the use and/or redemption of the ticket and/or information 512 related to the prize. The non-play area 520 may also include the name of the game such as "Global Games" 580 and/or the name such as "XYZ Lottery" 516 of, for example, one or more jurisdictions in which the lottery is played and/or the provider of the game such as a state lottery.

In embodiments of the present invention, the non-play area 520 may include a card identifier 514 that may identify the ticket. The identifier may also identify game and type of ticket or another number may be used for such identification. In embodiments of the present invention, the card identifier 514 may be generated by encrypting a ticket identifier that may stored in, for example, an lottery authentication database 131*a* or the like. The card identifier 514 may be created, in accordance with embodiments of the present invention, using an encryption key that may have been generated independently of and/or detached from the authentication database 131*a* and/or the information contained therein. The encrypted ticket identifier or card identifier 514 may be in plain view and/or may be entirely or partially hidden behind a latex covering and/or the like that may need to be scratched to reveal the card identifier 514.

In embodiments of the present invention, also included on the ticket may be decryption information 524 that may be one or more decryption keys and/or may be information related to the decryption key. The decryption key 524 may be used to decrypt the encrypted ticket identifier 514 to generate a ticket identifier. It is recognized that multiple decryption keys may be applied, for example, on after the other to the encrypted ticket identifier 514 to generate a ticket identifier. The generated ticket identifier may be compared with contents of a lottery ticket authentication database such as lottery ticket authentication database 131*a*. If a match is found in the lottery ticket authentication database 131*a*, then the lottery ticket may be authenticated as valid. It is recognized that the decryption key 524 may be the same as or may be different from the encryption key that was used to create the encrypted ticket identifier.

In embodiments of the present invention, encryption information 524 can be used to retrieve a decryption key from, for example, a secured database and/or a lottery ticket encryption/decryption server 180*a* that may store and or generate such keys based on the provided information. It is recognized that the decryption key or information 524 may be in plain view and/or may be entirely or partially hidden behind a latex covering or the like that may need to be scratched to reveal the encryption key 524, for example.

A machine-readable version 526 representing the numeric code of the card identifier 514 and/or the decryption key 524 may also be included in the ticket 500. The machine-readable version 526 may be a bar code, e.g., a stacked linear bar code or two-dimensional bar code. A standard 2 of 5 or other standard bar code may be employed. It will be appreciated that other forms of machine-readable information may be included on the ticket, in place of the bar codes, e.g., magnetic strips or smart card capability. The machine-readable version 526 may be read via a scanner or the like and the information may be used to verify, for example, whether the ticket 500 is authentic and/or to determiner whether the ticket is a winning ticket. It is recognized that the information may be entered manually via keyboard, touch screen, etc.

The lottery ticket 500 may also include logos or advertising information. The lottery ticket may include other rules, legal disclaimers, etc. that may be located on the front and/or the back of the lottery ticket.

The play area 522 may include game information such as numbers and/or pictures. The game information may be examined by a ticket purchaser in light of the rules of the game to determine whether the ticket is a winner, and if so the winning amount. Play area 522 may be in plain view or may be entirely or partially hidden behind a latex covering or the like that may need to be scratched to determine if the player has won.

In an embodiment of the present invention, a first encryption key may be used to encrypt a first identifier, such as a private ID for a lottery ticket, to get second ID or an encrypted private identifier. Another encryption key, such as a second encryption key may encrypt the second ID or the encrypted private identifier to generate the third ID or public ID. In this example, the third ID may be printed on the lottery ticket along with a first and/or second decryption keys, for example. The first ID and/or second ID may be stored in one or more databases. In one example, the first ID may be stored in one database and the second ID may be stored in another database. It is recognized that the first and second IDs may be stored in the same database.

In an embodiment of the present invention, either the first and/or second decrypting keys may be hidden on the ticket such as hidden behind latex or the like. The latex is removed to reveal the decrypting keys. For a first level of security, the third ID printed on the ticket may be decrypted using the second decryption key to find a first decrypted ID or a first result. The database may be searched to find a match for the first result. If a match for the first result is found (e.g., first result equals the second ID), then the lottery ticket may be authenticated. Additionally or optionally, a second level of security may be initiated. A second level of security may be desirable, for example, if the lottery ticket prize is high and additional security is desired to check that the ticket is authentic. For the second level of security, the first result may be decrypted using the first decryption key to generate a second result. The database may be searched to find a match for the second result. If a match for the second result is found (e.g., the second result equals the first ID), then the lottery ticket may be authenticated.

In embodiments of the present invention, if a match for the first result and/or the second result is not found in the database, then the lottery ticket may be indicated as unauthenticated or invalid. In some cases, another check may be performed to make sure that an error did not occur during the authentication process.

Embodiments of the present invention provide a method, apparatus, and/or system for protecting the privacy, integrity and/or authenticity of documents and/or other items.

Embodiments of the present invention may use encryption techniques to mark or identify items and to prevent illegitimate or unauthorized use and/or creation of these items.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of authenticating a lottery ticket, comprising:
   prior to issuance of a lottery ticket to a player, providing both a public identifier and a first public decryption key, to be included on a lottery ticket that is to be issued;
   after the lottery ticket has been issued, as part of a request to authenticate the lottery ticket, receiving, with a lottery ticket authentication system, a the public identifier and the first public decryption key read from the lottery ticket;
   decrypting, with the lottery ticket authentication system, the public identifier using the first public decryption key to generate a second identifier, wherein the second identifier is maintained separately in a lottery ticket authentication database of the lottery ticket authentication system to prevent an insider from determining the public identifier for the ticket;
   searching the contents of a lottery ticket authentication database containing entries associated with authentic lottery tickets to find a match for the second identifier; and
   responsive to finding a match for the second identifier in the lottery ticket authentication database, confirming, with the lottery ticket authentication system, that the lottery ticket is an authentic lottery ticket.

2. The method of claim 1, wherein the public identifier and the first public decryption key are printed on the lottery ticket.

3. The method of claim 2, further comprising:
   encrypting a private lottery ticket identifier using a first encryption key to generate the public identifier, wherein the private lottery ticket identifier is associated with the lottery ticket;
   storing the private lottery ticket identifier in the lottery ticket authentication database.

4. The method of claim 3, further comprising: generating the first encryption key and the first public decryption key.

5. The method of claim 3, wherein the first encryption key and the first public decryption key are the same.

6. The method of claim 3, wherein the first encryption key and the first public decryption key are different.

7. The method of claim 3, further comprising: encrypting the second identifier using a second encryption key to generate a third identifier.

8. The method of claim 7, further comprising: generating a second decryption key.

9. The method of claim 8, further comprising: decrypting the third identifier using the second decryption key to generate a first result.

10. The method of claim 3, wherein the first encryption key is associated with a plurality of lottery tickets.

11. The method of claim 3, wherein the first encryption key is uniquely associated with a single lottery ticket.

12. The method of claim 2, wherein the first public decryption key is associated with a plurality of lottery tickets.

13. The method of claim 2, wherein the first public decryption key is uniquely associated with a single lottery ticket.

14. The method of claim 1, further comprising: responsive to finding there is no match for the second identifier in the lottery ticket authentication database, indicating that the lottery ticket is not authentic.

15. A method of authenticating tickets, comprising:
prior to distribution of a ticket, providing both a public identifier and a first public decryption key, to be included on the ticket that is to be distributed;
after the ticket has been distributed, as part of a request to authenticate the ticket, receiving, with an authentication system, the public identifier and the first public decryption key read from the ticket;
decrypting, with the authentication system, the public identifier using the first public decryption key to generate a second identifier, wherein the second identifier is maintained separately in an authentication database of the authentication system to prevent an insider from determining the public identifier for the ticket:
searching the contents of the authentication database to find a match for the second identifier; and
responsive to finding a match for the second identifier in the authentication database, confirming, with the authentication system, that the ticket is authentic.

16. The method of claim 15, wherein the ticket is a lottery ticket.

17. The method of claim 15, wherein the ticket is a document.

18. The method of claim 15, wherein the public identifier and the first public decryption key are printed on the ticket.

19. The method of claim 18, further comprising:
encrypting a private ticket identifier using a first encryption key to generate the public identifier, wherein the private ticket identifier is associated with the ticket.

20. The method of claim 19, further comprising: generating the first encryption key and the first public decryption key.

21. The method of claim 19, wherein the first encryption key and the first public decryption key are the same.

22. The method of claim 19, wherein the first encryption key and the first public decryption key are different.

23. The method of claim 18, wherein the ticket is an event ticket.

24. The method of claim 18, wherein the ticket is a coupon.

25. The method of claim 18, further comprising:
responsive to finding there is no match for the second identifier in the authentication database, indicating that the ticket is not authentic.

26. A method of authenticating tickets, comprising:
prior to distribution of a ticket, encrypting a private item identifier using a first encryption key to generate a public identifier, wherein the private item identifier is associated with the ticket;
after distribution of the ticket, as part of a request to authenticate the ticket, receiving, with an authentication system, the public identifier associated with the ticket to be authenticated, wherein the public identifier is printed on the ticket prior to issuance of the ticket;
receiving, with the authentication system, a first public decryption key associated with the ticket, wherein the first public decryption key is printed on the ticket prior to issuance of the ticket;
responsive to receiving the public identifier and the first public decryption key, decrypting, with the authentication system, the public identifier using the first public decryption key to generate a second identifier, wherein the second identifier is maintained separately in an authentication database of the authentication system to prevent an insider from determining the public identifier for the ticket;
responsive to the decrypting, searching the contents of the authentication database to find a match for the second identifier; and
responsive to a match for the second identifier being found in the authentication database, confirming, with the authentication system, that the ticket is authentic.

27. A method of generating authentication information for a lottery ticket, comprising:
receiving a private identifier, wherein the private identifier is associated with the lottery ticket;
encrypting the private identifier using a first encryption key to generate a public identifier;
generating a first public decryption key to decrypt the public identifier;
outputting the public identifier and the first public decryption key;
maintaining the private identifier separately in a lottery ticket authentication database of a lottery ticket authentication system to prevent an insider from determining the public identifier for the ticket; and
prior to the lottery ticket being provided to a player, providing the public identifier and the first public decryption key on the lottery ticket so that the public identifier and the first public decryption key are readable from the lottery ticket.

28. The method of claim 27, wherein the first encryption key and the first public decryption key are the same.

29. The method of claim 27, further comprising: printing the public identifier and the first public decryption key on the lottery ticket.

30. The method of claim 27, further comprising: storing the private identifier in a lottery ticket authentication database.

31. The method of claim 30, further comprises:
receiving an authentication request from a client, wherein the authentication request includes the public lottery ticket identifier and the corresponding lottery ticket public decryption key;
responsive to receiving the authentication request, decrypting the public lottery ticket identifier using the corresponding lottery ticket public decryption key to generate a third identifier;
responsive to decrypting the public lottery ticket identifier, searching the contents of the lottery ticket authentication database to find a match for the third identifier; and
responsive to finding a match for the third identifier in the lottery ticket authentication database, validating the lottery ticket as authentic.

32. The method of claim 27, further comprising: printing the public identifier on the lottery ticket.

33. The method of claim 32, further comprising: retrieving the first public decryption key based on the public identifier from a key database.

34. The method of claim 27, further comprising: encrypting the public identifier using a second encryption key to generate a third identifier.

35. The method of claim 34, further comprising: generating a second decryption key to decrypt the third identifier.

36. The method of claim 35, further comprising: decrypting the third identifier using the second decryption key to generate the public identifier.

37. A method of generating authentication information for tickets, comprising:
receiving a private identifier, wherein the private identifier is associated with a ticket;

encrypting the private identifier using a first encryption key to generate a public identifier;

generating a first public decryption key to decrypt the private identifier; outputting the public identifier and the first public decryption key;

maintaining the private identifier separately in a ticket authentication database of a ticket authentication system to prevent an insider from determining the public identifier for the ticket; and prior to the ticket being provided to a consumer, providing the public identifier and the first public decryption key on the ticket so that the public identifier and the first public decryption key are readable from the ticket.

38. The method of claim 37, wherein the first encryption key and the first public decryption key are the same.

39. The method of claim 37, further comprising:
printing the public identifier and the first public decryption key on the item.

40. The method of claim 37, wherein the ticket is a lottery ticket.

41. The method of claim 37, wherein the ticket is a document.

42. The method of claim 37, wherein the ticket is an event ticket.

43. The method of claim 37, further comprising:
storing the private identifier in an authentication database.

44. The method of claim 43, further comprises:
receiving an authentication request from a client, wherein the authentication request includes a ticket identifier and a corresponding ticket public decryption key;

responsive to receiving the authentication request, decrypting the ticket identifier using the corresponding ticket public decryption key to generate a third identifier;

responsive to decrypting the ticket, searching the contents of the authentication database to find a match for the third identifier; and responsive to finding a match for the third identifier in the authentication database, validating the ticket as authentic.

45. The method of claim 37, further comprising:
printing the public identifier on the ticket.

46. An apparatus comprising:
an interface to receive a public identifier and a first public decryption key both readable from a ticket and provided on the ticket prior to the distribution of the ticket;

a decryption device to decrypt the public identifier using the first public decryption key to generate a second identifier, wherein the second identifier is maintained separately in an authentication database of an authentication system to prevent an insider from determining the public identifier for the ticket;

a comparator to search the contents of the authentication database to find a match for the second identifier, wherein the interface is configured to confirm that the ticket is authentic, responsive to finding a match for the second identifier in the authentication database.

47. The apparatus of claim 46, wherein the ticket is a lottery ticket.

48. The apparatus of claim 46, further comprising:
an encryption device to encrypt a private item identifier using a first encryption key to generate the public identifier, wherein the private item identifier is associated with the ticket.

49. The apparatus of claim 46, further comprises:
a client device to transmit the public identifier and the first public decryption key included with the ticket to the interface.

50. The apparatus of claim 46, further comprising:
a scanner to read the public identifier and the first public decryption key included with the ticket.

51. The apparatus of claim 46, wherein the public identifier and the first public decryption key are printed on the ticket.

52. A machine-readable medium having stored thereon a plurality of executable instructions to be executed by a processor to implement a method of authenticating a lottery ticket, the method comprising:
receiving a public identifier read from the lottery ticket to be authenticated;

receiving a first public decryption key read from the lottery ticket, where both the public identifier and the first public decryption key are provided on the lottery ticket prior to the issuance of the ticket to a player;

decrypting the public identifier using the first public decryption key to generate a second identifier, wherein the second identifier is maintained separately in a lottery ticket authentication database of a lottery ticket authentication system to prevent an insider from determining the public identifier for the ticket;

searching the contents of the lottery ticket authentication database containing entries associated with authentic lottery tickets to find a match for the second identifier; and responsive to finding a match for the second identifier in the lottery ticket authentication database, confirming that the lottery ticket is an authentic lottery ticket.

53. The machine-readable medium of claim 52, the method further comprising:
encrypting a private lottery ticket identifier using a first encryption key to generate the public identifier, wherein the private lottery ticket identifier is associated with the lottery ticket;

storing the private lottery ticket identifier in the lottery ticket authentication database.

54. The machine-readable medium of claim 53, the method further comprising:
generating the first encryption key and the first public decryption key.

55. The machine-readable medium of claim 53, the method further comprising: encrypting the second identifier using a second encryption key to generate a third identifier.

56. The machine-readable medium of claim 55, the method further comprising:
generating a second decryption key.

57. The machine-readable medium of claim 56, the method further comprising: decrypting the third identifier using the second decryption key to generate a first result.

58. The machine-readable medium of claim 52, wherein the public identifier and the first public decryption key are printed on the ticket.

59. A lottery ticket, comprising:
a public encrypted ticket identifier readable from the lottery ticket; and a public decryption key readable from the lottery ticket, the public decryption key configured to decrypt the encrypted ticket identifier;

wherein both the public encrypted ticket identifier and the public decryption key are provided on the lottery ticket prior to the lottery ticket being distributed to a player and the public decryption key is configured to decrypt the encrypted ticket identifier to generate an authentication identifier and the authentication identifier is maintained separately in a lottery ticket authentication database of a lottery ticket authentication system to prevent an insider from determining the public identifier for the ticket.

60. The lottery ticket of claim 59, wherein the encrypted ticket identifier is printed on the ticket.

61. The lottery ticket of claim 59, wherein the public decryption key is printed on the ticket.

62. The lottery ticket of claim 59, further comprising: a removable layer disposed to conceal the public decryption key.

63. The lottery ticket of claim 59, further comprising: a removable layer disposed to conceal the encrypted ticket identifier.

64. The lottery ticket of claim 59, wherein the lottery ticket is embodied in a smart card, the smart card storing the encrypted ticket identifier and the public decryption key.

65. The lottery ticket of claim 59, wherein the public decryption key is embodied in a machine-readable medium.

66. The lottery ticket of claim 59, wherein the public decryption key is embodied in a bar-code.

67. A method of generating lottery tickets, comprising:
   encrypting a private identifier using a first encrypting key to generate an intermediate identifier;
   encrypting the intermediate identifier using a second encrypting key to generate a public identifier;
   generating a first decrypting key configured to decrypt the intermediate identifier and a second decrypting key configured to decrypt the public identifier to generate a first result; and
   prior to providing a lottery ticket to a player, printing on the lottery ticket the public identifier, the first decrypting key and the second decrypting key, wherein the first result is maintained separately in a database of a system to prevent an insider from determining the public identifier for the ticket.

68. The method of claim 67, further comprising: storing the private identifier and the intermediate identifier in a database.

69. The method of claim 68, further comprising: decrypting the public identifier using the second decrypting key to generate a first result.

70. The method of claim 69, further comprising: responsive to finding the first result in the database, authenticating the lottery ticket.

71. The method of claim 70, further comprising: responsive to finding the first result is not in the database, indicating that the lottery ticket is not authenticated.

72. The method of claim 69, further comprising: responsive to finding the first result in the database, decrypting the first result using the first decrypting key to generate a second result.

73. The method of claim 72, further comprising: responsive to finding the second result in the database, authenticating the lottery ticket.

74. The method of claim 73, further comprising: responsive to finding the second result is not in the database, indicating that the lottery ticket is not authenticated.

* * * * *

UNITED STATES PATENT AND TRADEMARK OFFICE
CERTIFICATE OF CORRECTION

PATENT NO. : 7,749,080 B2  Page 1 of 1
APPLICATION NO. : 11/056857
DATED : July 6, 2010
INVENTOR(S) : Walter Szrek and Thomas K. Oram It is certified that error appears in the above-identified patent and that said Letters Patent is hereby corrected as shown below:

Title page, insert the following:

--Related U.S. Application Data (63) Continuation of application No. 10/843,967, filed on May 11, 2004, now abandoned.
(60) Provisional application No. 60/469,994, filed on May 12, 2003.--

Col. 1, line 3, insert the following paragraph:

--CROSS-REFERENCE TO RELATED APPLICATIONS
This application is a continuation of application No. 10/843,967, filed on May 11, 2004, now abandoned, which claims the benefit of Provisional application No. 60/469,994, filed on May 12, 2003, both of which are incorporated herein in their entireties.--

Column 1, line 33 delete the word "come" and insert the word --some-- so it reads as follows:

In some cases, a time limit should be established during

Signed and Sealed this

Twenty-first Day of December, 2010

David J. Kappos
*Director of the United States Patent and Trademark Office*